May 19, 1970  T. BRIMBERG  3,512,813
ROD COUPLING
Filed Dec. 9, 1968
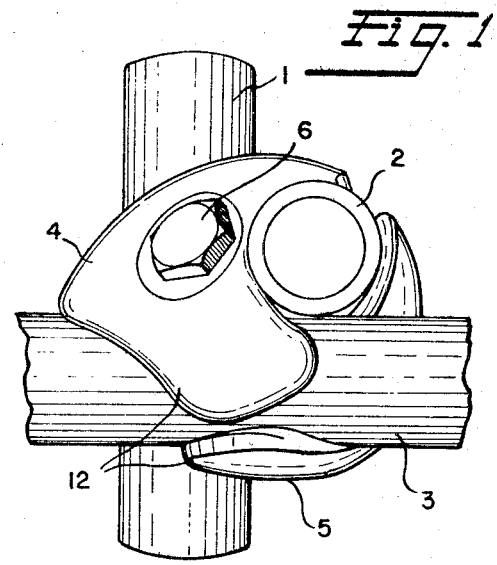
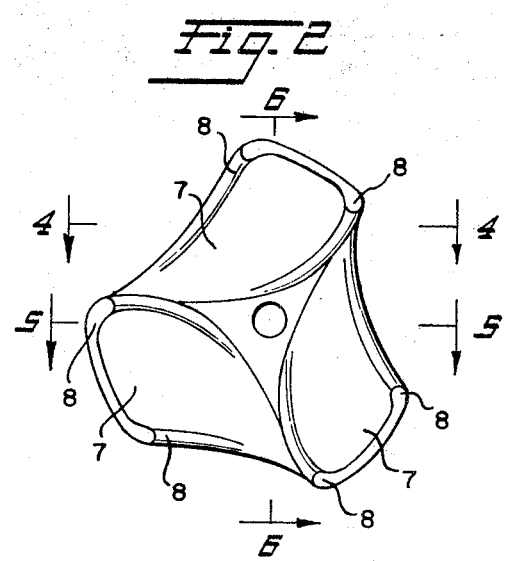
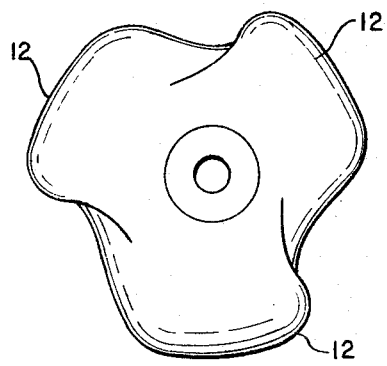
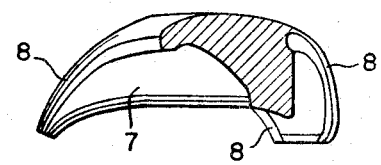
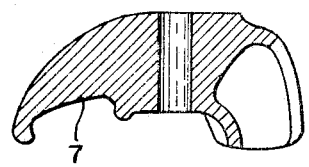
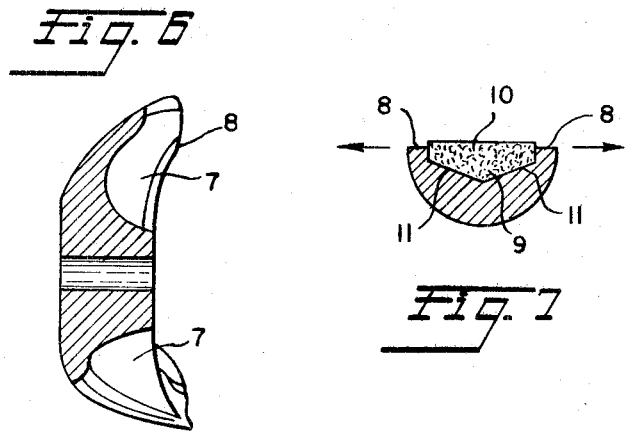
INVENTOR.
TORSTEN BRIMBERG
BY
Burns, Doane, Benedict, Swecker & Mathis
ATTORNEYS United States Patent Office 3,512,813
Patented May 19, 1970

3,512,813
ROD COUPLING
Torsten Brimberg, Box 21, Mellosa, Sweden
Filed Dec. 9, 1968, Ser. No. 782,109
Int. Cl. F16b 7/04
U.S. Cl. 287—49    7 Claims

ABSTRACT OF THE DISCLOSURE

A coupler for releasably connecting two or more rods to one another when erecting scaffoldings, storage racks or the like. The clamp members engage each of the rods to be connected and also force the rods against each other. A frictional material is provided in the groove of the clamp to produce a wedging effect as displacement of the rods occurs.

BACKGROUND OF THE INVENTION

This invention relates to a coupler intended for use to releasably connect two, three or more rods at given angles to one another. Examples of fields of application are building scaffoldings, storage racks, signposts, loading pallets, counters, tables, work benches and the like, where it is desired to connect several rods at given angles in relation to one another, and to hold the rods together at a point. This connection must be a releasable one and it must be possible to effect the connection and release without having recourse to complicated tools. Furthermore, the connecting and disconnecting has to be possible without altering or damaging the rods or connecting elements.

In the following, the expression "rods" is intended to include, and indeed it is the principal case, tubes for example of circular cross-section, since these are lighter and cheaper in respect of their strength and weight. It is, however, fully possible to use rods of any desired section, the connecting elements being adapted to the section.

Connecting elements of this general type are already known and are now commonly used for releasable connection of three rods at given angles.

The couplers in accordance with the invention, like the known couplers of the kind in question, consist of two like half-couplers preferably reciprocally engaging, which are formed per se with slots or seatings for accommodating rods which are intended to be connected with one another at given angles. The two half-couplers are assembled in their connecting position by means of a connecting member which extends through the two half-couplers in a direction which nearly coincides with the spatial bisector of the spatial angle enclosed by the rods.

The rods are so situated that each one of them is placed so as to lie between two others. In known couplers, the slots or recesses in the two half-couplers are so formed and position in the axial direction of the rod that in almost any position the connecting-pressure is exerted on each and every one of the rods at right angles to the longitudinal direction of the rod.

It is clear that the connecting pressure both theoretically and in practice can finally occur at a point in each slot of the coupler halves opposite where its rod is and that it is not possible to obtain a sufficiently great connecting pressure which would enable the connections to withstand heavy loads. In practice it has been found that, particularly in the case of large dimensions, a constant continuous positioning cannot be obtained purely and simply because the surfaces of application of forces between the rods and the slots or grooves in the coupler halves are too small.

It is an object of the invention to provide a novel coupler that is capable of supplying increased holding forces on the support rods which is characterized in that the different slots of the coupler halves provide a greater distance of contact between the various surfaces and the rods against which they are applied than was heretofore obtained.

Another object is to provide a novel coupling member having recesses for holding inserts of frictional material which facilitates the gripping of the rods.

A further object is to provide a novel coupler arrangement where the force holding the coupling members together is directed along a spatial bisector of the spatial angle formed by the rods being coupled together.

BRIEF DESCRIPTION OF THE DRAWINGS

FIG. 1 shows three rods lying in three mutually perpendicular planes connected together by a constricting coupler in accord with the present invention;

FIG. 2 is a top plan of the lower half-coupler in the coupler in FIG. 1;

FIG. 3 shows the upper half of the coupler;

FIGS. 4, 5 and 6 show various sections as indicated of the half-coupler in FIG. 2; and FIG. 7 is an elevation in section showing the recesses filled with a friction material located between exterior protuberances.

DETAILED DESCRIPTION

In FIG. 1, three tubes 1, 2 and 3 are assembled by means of the coupler in accordance with the invention, consisting of the half-couplers 4 and 5, together with the connecting member 6. In the illustrated example, the tubes lie at right angles to one another. It can clearly be seen from FIG. 1 how the three tubes 1, 2 and 3 can be made to lie in relationships to one another other than that illustrated in the example. The several tubes are clamped fast by the force which is exerted between the two half-couplers 4 and 5.

If, however, the groove or slot 7, formed by each of a plurality of arcuate wing members 12 in which the tubes lie, has a smooth metallic surface as is the case with the hitherto-known types of coupler of the kind in question, there is only a spot application of the holding force between the groove 7 and the tube. It is difficult, and indeed almost impossible, to obtain a completely stable connection which would resist heavy loads such as may occur, for instance, in the case of building scaffolding.

One of the features of the present invention resides in the fact that the coupler grooves 7 formed by each of the arcuate wing members 12 are provided with "booms" or protuberances 8, such as shown in FIG. 7, located at a distance apart from one another as great as possible. The recesses 9 formed by the protuberances 8 are filled, in one form of embodiment of the invention, with a core 10 of a material such as rubber which has a higher coefficient of friction than that of the coupler. The result of this is that the coupler tends to secure each of the connected rods while at the same time clamping rods 1, 2 and 3 against slipping relataive to each other. In this way, groove areas that engage each rod 1, 2 and 3 will increase in a direction perpendicular to the respective axis of the rods as the tightening means is tightened.

The arrows in FIG. 7 indicate possible directions of slip or sliding, and from the figure, it is evident that the configuration of the recesses 9 formed by the protuberances 8 provides several advantages. When slip occurs, there is produced by the friction lining 10 in cooperation with the inclined surface 11 withdrawn from the plane through the protuberances 8, a wedging effect which selectively enhances the chucking strength of the coupler.

In the example of embodiment represented, each tube or rod 1, 2 and 3 is clamped between the arcuate wings 12 of each half-coupler and the other two rods or tubes. Each half-coupler, that is to say, because of accommodating the three grooves 7, exhibits between the groove mouths in the periphery of the coupler halves arcuate, wings 12 so extending and in such positions that, as the coupler is drawn together, the connecting pressure is exerted on each of the tubes between one such wing on one half-coupler and a similar wing on the other half-coupler, so that the said connecting pressure results in a correct angular relationship with the longitudinal direction of the rod. If sliding in the longitudinal direction of the rod occurs, the rod is wedged by the increasing pressure due to the wedging effect, while the frictional pressure against the other two tubes also increases.

Owing to the provision of the "booms" or protuberances 8 there is obtained a slight deformation of the tubes where in contact with the booms, which hitherto it was not possible to obtain. The coupler halves can easily be varied in form for more rods than three, or for less.

The connnecting together of the two half-couplers, in the example shown, is illustrated as being effected by bolts 6. It is, however, also easily possible to use other connecting devices such as clamps, straps or the like.

The grooves 7 in the half-couplers should preferably be given a section corresponding to that of the periphery of the rods which are to be connected. The rods illustrated take the form of tubes, but other sections may be used. An important feature is that in the case of large sizes, the area of contact between the seats and rods can be made twice as great as in the case of prior couplers.

The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A coupling for connecting three or more elongate members, the coupling comprising two separable portions each having a central axis and a plurality of complementary arcuate wing members adapted to receive said elongate members thereacross, each arcuate wing member having a substantially radially extending protuberance defining each open end of the arcuate portion thereof and on which the elongate members rest when received between the coupling portions with each elongate member being disposed between two adjacent members; tightening means acting in the axial direction of the coupling and extending through a central region of the coupling surrounded by the arcuate wing members, the arcuate wing members with said protuberances providing groove areas extending across the axis of the elongate member received thereby; and a frictional material having a higher coefficient of friction than that of the remainder of the coupler material that engages said elongate members positioned between said protuberances in at least one of said arcuate wing members.

2. A coupling as claimed in claim 1, wherein the angular relation of the complementary arcuate wing members causes each elongate member to be brought into frictional engagement with the adjacent elongate members when the coupling is tightened.

3. A coupling as claimed in claim 2, wherein the angular relation of the arcuate wing members is such that, when the elongate members are assembled between the tightened coupling portions, areas of the respective arcuate wing members on either side of each elongate member and in contact therewith and the points of contact of said elongate member with the adjacent elongate members together form the corners of a tetrahedron.

4. A coupling as claimed in claim 1, wherein the arcuate wing members in each coupling portion are symmetrically arranged about the axis of said portion.

5. A rod coupler for releasably connecting an assembly of at least two rods at predetermined angles, comprising a pair of half-couplers each having a plurality of arcuate members for receiving the rods therein extending radially from a central portion and each provided with a radial protuberance defining each end of the arcuate member, each of said arcuate members having a recess therein formed between said protuberances; a frictional material having a higher coefficient of friction than that of the remainder of the coupler material provided in each of said recesses, said frictional material and said protuberances cooperating to tightly engage said rods; and means for securing said half-couplers together in their connecting positions by means of a constricting member whose line of force extends through the two half-couplers in a direction which substantially coincides with the spatial angle defined by the rods.

6. A rod coupler as claimed in claim 5 wherein said frictional material provides a wedging action which opposes slippage between said rods and said coupler.

7. A rod coupler as claimed in claim 6 wherein said recesses are formed with surfaces which are inclined with respect to a plane through said protuberances to increase the wedging action of said frictional material within said recess.

References Cited

UNITED STATES PATENTS

| 595,196 | 12/1897 | Newman et al. | 287—49 XR |
|---|---|---|---|
| 1,165,419 | 12/1915 | King. | |
| 1,678,879 | 7/1928 | Selah. | |
| 2,529,173 | 11/1950 | Moyer et al. | |
| 2,942,899 | 6/1960 | Rifkin. | |

FOREIGN PATENTS

| 162,387 | 4/1921 | Great Britain. |
|---|---|---|
| 1,024,915 | 1/1953 | France. |
| 408,381 | 9/1966 | Switzerland. |

DAVID J. WILLIAMOWSKY, Primary Examiner

A. V. KUNDRAT, Assistant Examiner

U.S. Cl. X.R.

287—54